Feb. 23, 1932. L. A. M. PHELAN Re. 18,361

BEST AVAILABLE COPY

THERMOSTATIC SWITCH

Original Filed Nov. 27, 1925

Inventor
Louis A. M. Phelan
By Jno. Addington, Ames & Seibold.
Attys.

Reissued Feb. 23, 1932

BEST AVAILABLE COPY

Re. 18,361

UNITED STATES PATENT OFFICE

LOUIS A. M. PHELAN, OF CHICAGO, ILLINOIS, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

THERMOSTATIC SWITCH

Original No. 1,764,345, dated June 17, 1930, Serial No. 71,857, filed November 27, 1925. Application for reissue filed January 11, 1932. Serial No. 586,021.

My invention relates to a switching means, and it has particular relation to thermostatically controlled switching means.

One object of my invention is to provide switching means of the character designated wherein a plurality of adjustable controls are provided and wherein, moreover, the connections between the actuating means and the switching means are such as to impose no strain upon the mechanism in case the operation of the actuating means goes beyond the limits of the switching means.

As will be better understood when my invention has been more fully described, there frequently arises circumstances wherein it is desired to actuate tiltable switches from a thermostatically operated actuator.

In the past, so far as I am aware, one great difficulty in combining these features has been the lack of means for allowing the actuating member to override, or continue to move in the same direction as, the switching means, after the latter have reached a predetermined limit. One particular application of my invention is in connection with tiltable switches, and for purposes of illustration, hereinafter described as tiltable mercury contactor switches.

Switches of the last named type are becoming more and more used where a minimum of energy is available for actuating purposes. These switches may be used in such connection because a very slight tilt or over-the-center movement is necessary to effect a change of circuit connection.

By this same token, however, in the use of such switches, as heretofore presented, there has existed marked difficulty, since it has been impossible to insure the cessation of the actuating force at the same time that the very slight limits of switch movements had been reached.

As will be apparent from the invention hereinafter described, I provide for such apparently irreconcilable functions by frictionally, or otherwise similarly, connecting the tiltable switch proper and the actuating means, thereby allowing the switch to be tilted in one direction, whereafter the actuating means may continue to operate without further moving said switch.

On the other hand, it is of course necessary that, when a reversal of function, for instance when a thermostat element changes its direction of movement, the switch shall immediately be actuated. This operation is also provided for in my improved switch, which is hereinafter described.

Another feature of the hereinafter described switch, is the provision of two distinct means for adjusting the movement of said switch in response to changes initiated by a thermostatically controlled actuator or some similar actuating means.

I provide one set of adjustable controlling means whereby the time of circuit change effected by my switch is predetermined, that is, the period between the occurrence of a certain event and the time when the switch shall change the circuit connections is easily predetermined. Again, an adjustment is provided whereby the celerity of response, after the occurrence of a predetermined event, may be accurately provided for. With these two adjustments, my improved switching mechanism finds beneficial and increasingly numerous applications in automatic oil heating systems, and other fields where it is necessary to insure a marked positiveness of operation with a minimum of energy consumption.

In furtherance of this latter object, and particularly in the fields which I have mentioned, my invention further consists in the provision of a novel heating element for use in connection with a bimetallic actuator, this element comprising a heating coil which is secured within a glass tube, which tube is connected to the element in question. The employment of such a combination admits of the use of a very fine heating element, and one which is operable with a minimum of energy and marked positiveness of control.

While I have illustrated this novel heating coil in connection with the hereinafter described switch, it may of course find ready use in other connections.

A better understanding of my invention

BEST AVAILABLE COPY may be had from the accompanying drawings, in which—

Figure 1:
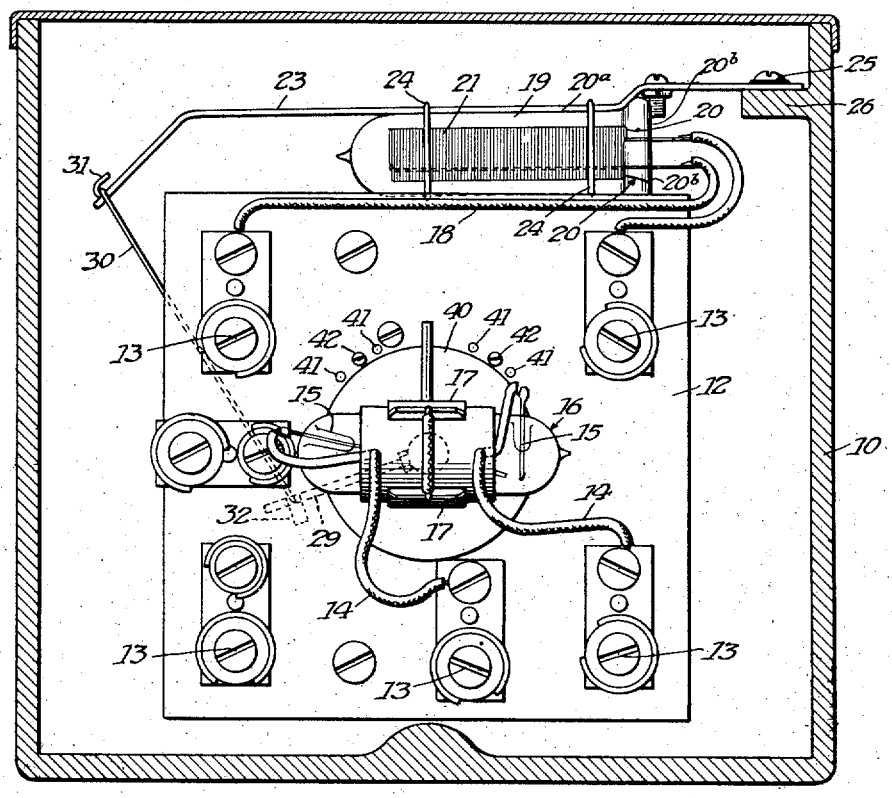
Figure 1 is a front, elevational view of a switch embodying my invention.
Figure 2:
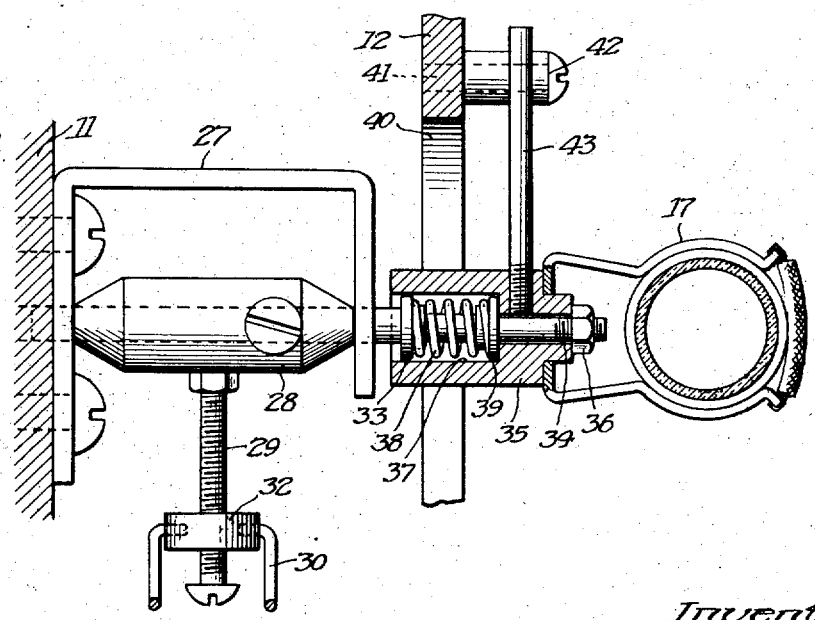
Fig. 2 is a side elevational view, partially in section of one portion of the switch of Fig. 1.

Referring now more particularly to the drawings, the thermostatically operated switch embodying my invention comprises a casing 10 having a back wall 11, to which wall is fixed a plate 12, the latter being disposed (as best shown in Fig. 2) enough in front of said wall 11 to leave sufficient space for the disposition of certain elements of the switch. A plurality of binding posts 13 is positioned on said plate 12 and to these latter may be connected the lead wires used in connection with the aforesaid switch, it being noted that lead wires 14—14 are connected to electrodes 15—15 of a mercury tube contactor switch 16. The latter switch is mounted in a clip 17.

Other lead wires 18—18 are connected to the upper binding posts on the plate and supply current to a heating element 19. The heating element 19 comprises an elongated tube having a re-entrant portion 20, about which a heating coil 21 is wound, this latter being connected to the wire 18—18, whence energy is derived for the operation of said coil. It will be noted from the construction of the tube 19, that the heating coil 21 is disposed interiorly thereof and wound about the re-entrant portion, being sealed therein, whereby the coil is disposed on an integrally formed portion of the tube, eventuating a heating element of very compact and very desirable form.

In forming this element, the re-entrant portion first has the coil wound thereabout, the lead-in wires being sealed through this portion and lead out through the open end of the same. Then the outside portion $20^a$ of tube is placed in enveloping relation to the reentrant part, said outside part having a lip $20^b$, which is then in close contact with the lip at the open end of the reentrant portion. The two portions of the tube are then sealed where they meet wherefrom the heating coil is contained within said tube and is wound on the reentrant portion, as shown.

A strip of mica may be positioned along the top of the re-entrant portion 20 and under the coil 21, thereby providing means for keeping the turns of the coil 21 apart and insulating them one from the other, said mica at the same time acting in a desirable manner when the turns of the coil 21 become hot and tend to expand.

The aforesaid heating element 19 is secured to a bimetallic member 23 by strips 24. The bimetallic element 23 is fixed at one end 25 to a lug 26, the latter being a portion of one of the walls 10 of the switch casing. It is apparent, therefore, that when said coil is supplied with current the heat generated rises and serves to bend the strip 23, wherefrom an actuating force for the switch is derived.

Fixed on the back wall 11 of the switch casing is a member 27, in which is rotarily mounted a hub 28, from which hub projects a threaded crank pin 29. A connecting rod 30 comprising two arms is secured to the outer end of the bimetallic element 23 by means of a hook 31, the other ends of the arms of said rod 30 being secured in a collar 32, which latter is movable along the threads of the crank 29.

When it is desired to change the angular relation between the rod 30 and the crank 29 it is only necessary to lift the upper end of the rod from under the hook 31 and rotate the collar 32 thereby moving the latter and the lower end of rod 30 along the crank 29. This latter adjustment is one of those above referred to, by means of which I am able to regulate the operation of my switch within very close limits for desirable purposes.

Beyond the righthand journalled support of the member 28, the latter is provided with a collar 33, beyond which point the aforesaid member is reduced to form a threaded spindle portion 34. A collar-like member 35 is loosely secured on the shaft-like portion 34 by means of a nut 36, this portion 35 functioning as a support for the contactor tube clip 17. The lefthand end of the member 35 is formed with a socket 37. A spiral spring 38 surrounds the shaft 34 and is confined by the collar 33 and another collar 39, the latter being free to slide along the shaft 34 under the pressure of said spring 38 and push said member 35 against nut 36, whereby said member 35 is gripped between collar 39 and nut 36 and is moved when said shaft 34 is rotated.

It will be noticed that the member 35 protrudes through a circular opening 40 in the plate 12. Positioned about the upper periphery of the aforesaid opening 40 are a plurality of holes 41 in which may be positioned, in any desired relation, stop or limiting members 42. A pin 43 is rigidly secured to the contactor tube supporting member 35 and the positioning of the stop members 42 in the path of travel of said pin 43 eventuates a desirable control of the distance through which said tube may tilt when actuated by the bimetallic element 23.

As I have hereinbefore indicated, one of the advantages of my present invention resides in the frictional connection between the actuating means and the switch member whereby the actuating means may continue to move in either direction after the switch has reached its extreme limit of movement in a like direction, without undue strains being imposed on the mechanism. This is accomplished through the combination just de-

BEST AVAILABLE COPY scribed whereby the rotary movement of the member 28 is imparted to the member 35 by reason of the spring 38 pressing the collar 39 against the end of the socketed portion of said member 35. When the pin 43 contacts with one of the stop members 42, the movement of the member 35 is arrested. However, the actuating member 28 may continue to move, as it very frequently will, under the influence of the continued flexing of the bimetallic element, since the loose collar 39 will slide over the end of the socket 37 and permit the overriding movement of the actuator. However, immediately upon a reversed flexing of the member 23, the tube supporting member 35 will be "picked up" and moved in a reversed direction, it not being necessary to wait the return of the actuator to the point at which the movement of the tube was arrested. This combination is of marked advantage in connection with many devices which may be controlled by switching mechanism.

This feature of my invention is particularly advantageous in connection with oil burning systems, in which latter the switch may be used in connection with a pilot circuit in said system.

It is not believed necessary to elaborate upon the operation of my invention since it is thought that the same may be readily understood from the above description. Briefly, however, the heating of the bimetallic strip 23 by the passage of current through the coil 22, results in a flexing of said strip whereupon a thrust is imparted to the connecting rod 30, which in turn moves the crank 29, and this latter movement will tilt the metallic tube and change the circuits controlled by said switch.

By means of the threaded connection, between the connecting rod collar 32 and the crank 29 the angularity between the rod and the crank may be varied, so that a definite displacement of the extremity of member 23 may be caused to exercise a more or less change of the crank, it being noted that as the collar 32 is moved to the right along said crank, the angle therebetween is made more obtuse, wherefrom the same thrust will eventuate a decreased movement of said contactor tube.

Again the pins 42 may be placed closer together or farther apart, which will vary the distance which the tube must travel from extreme position until it moves over center and the mercury globule therein changes the circuit.

Finally, as pointed out before, the mercury tube is frictionally mounted on the shaft to which the crank is fixed and is constrained to move in either direction as far as is permitted by the stops 42, whereafter the axle or hub 28 may continue its travel in the same direction without harmful results.

The purpose of this connection is to insure that, upon a reversal of direction of warping or flexing of the bimetallic strip, an immediate change in direction of movement of the contactor tube will take place.

The purpose of the above controls and adjustment is to provide an accurate means of predetermining the time of occurrence of certain electrical events in perfect sequence, these events being controlled by the movement of the mercury in the contactor tube.

As before indicated, the further the tube departs from the position at which the mercury travels over-center, the further it must travel to return to this position upon a reversal of the actuating force derived from said bimetallic strip. Again, the crank pin adjustment heretofore described may be utilized to cause a given change in temperature of said bimetallic strip to eventuate a more or less angle of tilt.

My invention, therefore, provides two distinct methods of adjusting the time between said mechanical events which are controlled through the switch mechanism above described, and provides a controlling device which is of considerable service in many fields.

While I have described but one embodiment of my invention, it is obvious that many modifications may be made therein by those skilled in the art, without departing from the spirit of my invention and I desire, therefore, that the same be limited only by the scope of the appended claims or by the prior art.

I claim:

1. In a device of the class described, a switch comprising a tiltable mercury tube contactor, means for limiting the extreme points of movement of said contactor, thermostatic actuating means for said switch, and frictional means connecting said actuating means and said switch comprising a socketed rotarily mounted member upon which said contactor is mounted, and another rotarily mounted member positioned on an axis coextensive with said first member and having a frictional connection therewith within the said socket portion.

2. In a device of the class described, a rotarily mounted switch, actuating means therefor, means for adjustably predetermining the limits of movement of said switch, a rotary member rotated by said actuating means, and a collar frictionally connected to said rotary member to which said switch is attached whereby said rotary member may move while said collar remains stationary.

3. In a device of the class described, a rotarily movable switch member, actuating means for said switch member comprising a mounting member, a collar on said mounting member embodying a socketed portion enveloping a portion of said mounting member, said switch member being mounted on

BEST AVAILABLE COPY said collar, and spring means effecting a frictional engagement between said collar and said mounting member.

4. A rotarily movable switch member, a collar supporting said switch member, said collar being provided with a central axially extending recessed portion, a switch actuating member comprising a shaft upon which said collar may be mounted, an abutment movable along said shaft, and spring means seated within said recessed portion to move said abutment against said collar, the other end of said spring being secured to said shaft to promote the frictional engagement between the switch member and the actuating member.

5. In a device of the class described, a rotatably mounted tiltable switch, a gradually movable thermal responsive actuator therefor, a connection therebetween, and means for varying the angularity of the connection.

6. In a device of the class described, a rotatably mounted tiltable switch, a gradually movable thermal responsive actuator therefor, a crank member attached to the switch, and a connector between said actuator and the crank member for varying the angularity between said crank member and said connector.

7. In a device of the class described, a rotatably mounted tiltable switch, an actuator therefor, a crank member attached to the switch, and a connector between said actuator and the crank member having a threaded connection with said crank for varying the angularity between said crank and said connector.

8. In a device of the class described, a tiltable switch, a crank member, a frictional connection between said crank member and switch, an actuator, a rod connecting said crank and said actuator, and means for varying the angular relation between said rod and said crank member.

9. In a device of the class described, a tiltable switch, a crank member, a frictional connection between said crank member and switch, an actuator, a rod connecting said crank and said actuator, and means providing for adjustment between said rod and said crank member.

10. In a device of the class described, a tiltable switch, a crank member, a frictional connection between said crank member and switch, an actautor, a rod connecting said crank member and said actuator, and means providing for adjustment between said rod and said crank member comprising a threaded connection between said rod and crank member.

11. In a device of the class described, a tiltable switch, a support therefor, a crank frictionally connected to said support, an actuator, a rod movable by said actuator, and means connecting said rod to said crank in threaded relation.

12. In a device of the class described, a tiltable switch, a support therefor, a crank frictionally connected to said support, a thermostatic actuator fixed at one end, a rod fastened to the other end thereof, and means connecting said rod to said crank in threaded relation.

13. In a device of the class described, a tiltable switch, a support therefor, a crank frictionally connected to said support, a bimetallic member fixed at one end, heating means therefor, a rod connected to the other end of said member, and means connecting said rod to said crank in threaded relation.

14. In a device of the class described, a tiltable switch, a support therefor, a crank frictionally connected to said support, a bimetallic member fixed at one end, heating means therefor comprising a sealed tube fastened to said member and having a heating coil therein, and means for connecting said bimetallic member to said crank in threaded relation.

15. In a device of the class described, a tiltable switch, a support therefor, a crank frictionally connected to said support, an adjustable means for limiting the movement of said switch comprising an arm on said support and adjustable stops positionable in the path of said arm, an actuator, a rod movable by said actuator, and means connecting said rod to said crank in threaded relation.

16. In a device of the class described, a tiltable switch, a pivoted support in which said switch is mounted, adjustable means for predetermining the limits between which said switch may be tilted, a rotary member frictionally connected to said support, a threaded crank connected to said member, a thermostatically movable actuator comprising a bimetallic element fixed at one end, a rod carried by the other end thereof, and an adjustable connection between said rod and said crank comprising means for moving said rod along said threaded crank.

17. In a device of the class described, a tiltable switch, a pivoted support in which said switch is mounted, adjustable means for predetermining the limits between which said switch may be tilted, a rotary member frictionally connected to said support, a threaded crank connected to said member, a thermostatically movable actuator comprising a bimetallic element fixed at one end, a heating coil depending therefrom, a rod carried by the other end thereof, and an adjustable connection between said rod and said crank comprising means for moving said rod along said threaded crank.

18. In a device of the class described, a tiltable switch, a pivoted support in which said switch is mounted, adjustable means for predetermining the limits between which said switch may be tilted, a rotary member frictionally connected to said support, a threaded crank connected to said rotary member, a thermostatically movable actuator comprising a bimetallic element fixed at one end, a heating coil depending from said bimetallic element, a rod carried by the other end of said bimetallic element, and an adjustable connection between said rod and said crank comprising means for moving said rod along said threaded crank, heating means for said bimetallic element depending therefrom and comprising a sealed tube having an elongated reentrant portion with a current-carrying coil wrapped around the interior of said reentrant portion.

19. A thermostatic element comprising a bimetallic member fixed at one end and having heating means therefor depending therefrom and comprising a sealed tube having an elongated reentrant portion with a current-carrying coil wrapped around the interior of said reentrant portion.

20. In a device of the class described, a tiltable switch, actuating means therefor, means for adjustably predetermining the limits of movement of said switch, an arm actuated by said actuating means for carrying said tiltable switch extending to engage said limiting means, and an adjustable spring member for frictionally engaging said actuating means and said arm.

21. In a device of the character described, a casing, a tiltable switch disposed in said casing, said casing having a plurality of spaced apertures on a wall thereof, a pair of pins for engaging any two of said apertures, actuating means for said switch, carrying means frictionally held on said actuating means operating between and limited by said pins whereby said actuating means may have an overriding movement at the limit of movement of said switching means but insuring an immediate reverse movement of said switching means upon a reverse movement of said actuating means.

22. An electric switch comprising an actuator adapted to move through a relatively wide range, a mercury electric contactor, a holder therefor, said holder adapted to move through a relatively narrow range, means for adjusting the span of the range through which said holder moves, and yielding continuously acting frictional slip connecting means between said holder and said actuator whereby relative movement therebetween obtains when said holder reaches either end of its narrower range of movement.

23. An electric switch comprising an actuator adapted to move through a relatively wide range, a mercury electric contactor, a holder therefor, said holder adapted to move through a relatively narrow range, means for adjusting the span of the range through which said holder moves, yielding continuously acting frictional slip connecting means between said holder and said actuator whereby relative movement therebetween obtains when said holder reaches either end of its narrower range of movement, and means for adjusting said yielding continuously acting frictional slip connecting means.

24. An electric switch comprising an actuator adapted to move through a relatively wide range of movement, an electric switch controlled by said actuator, said electric switch being adapted to move through a relatively narrow range for the purpose of opening and closing an associated electric circuit, means for adjusting the span of the range through which said electric switch may move, frictional slip connecting means between said electric switch and said actuator whereby relative movement therebetween obtains when said electric switch reaches either end of its narrower range of movement, and means for adjusting said frictional slip connecting means.

25. An electric switch comprising an actuator adapted to move through a relatively wide range, an electric switch controlled thereby which is adapted to move within a range limited in at least one direction, means for adjusting the range through which said electric switch may move, frictional slip connecting means between said actuator and said electric switch whereby relative movement therebetween obtains after said electric switch has moved in at least one direction to the limit of its range, and means for adjusting said frictional slip connecting means.

26. An electric switch comprising a thermal element having one end fixed and the other end movable, a rotatably mounted holder adapted to be moved by said movable end of the thermal element, a mercury electric contactor mounted on said holder, adjustable means for limiting the degree of movement of said holder within the span of movement of said movable end of said thermal element, and slip connecting means interposed between said holder and said movable end of the thermal element, said connecting means comprising an adjustable spring element.

27. An elastic switching mechanism comprising an actuator adapted to move through a relatively wide range, an electric switch adapted to move through a relatively narrower range, means for adjusting the span of the range of movement of said electric switch, and yielding continuously acting frictional slip connecting means between said electric switch and said actuator whereby relative movement therebetween obtains when the former reaches either end of its narrower range of movement.

In testimony whereof I have subscribed my name this 7th day of January, 1932.

LOUIS A. M. PHELAN.